US012546366B2

(12) United States Patent
Nishimura et al.

(10) Patent No.: US 12,546,366 B2
(45) Date of Patent: Feb. 10, 2026

(54) ROLLING BEARING

(71) Applicant: MINEBEA MITSUMI Inc., Nagano (JP)

(72) Inventors: Kenichiro Nishimura, Kitasaku (JP); Yoji Horiuchi, Kitasaku (JP)

(73) Assignee: MINEBEA MITSUMI Inc., Nagano (JP)

( * ) Notice: Subject to any disclaimer, the term of this patent is extended or adjusted under 35 U.S.C. 154(b) by 3 days.

(21) Appl. No.: 18/705,167

(22) PCT Filed: Oct. 12, 2022

(86) PCT No.: PCT/JP2022/037997
§ 371 (c)(1),
(2) Date: Apr. 26, 2024

(87) PCT Pub. No.: WO2023/074364
PCT Pub. Date: May 4, 2023

(65) Prior Publication Data
US 2025/0060004 A1  Feb. 20, 2025

(30) Foreign Application Priority Data
Oct. 28, 2021 (JP) ................................. 2021-176773

(51) Int. Cl.
*F16C 19/06* (2006.01)
*F16C 27/06* (2006.01)
(Continued)

(52) U.S. Cl.
CPC ............ *F16C 33/586* (2013.01); *F16C 19/06* (2013.01); *F16C 27/066* (2013.01); *F16C 35/077* (2013.01)

(58) Field of Classification Search
CPC ...... F16C 19/06; F16C 27/066; F16C 33/586; F16C 33/768; F16C 33/7816; F16C 33/7886; F16C 35/077
See application file for complete search history.

(56) References Cited

U.S. PATENT DOCUMENTS 2,283,839 A * 5/1942 Wright ................. H02K 5/1732
384/536
4,696,587 A * 9/1987 Nishida ................. F16C 33/586
384/585
(Continued)

FOREIGN PATENT DOCUMENTS

JP    H08-74845 A      3/1996
JP    2005-321006 A   11/2005
(Continued)

OTHER PUBLICATIONS

English translation of the Written Opinion for corresponding International Application No. PCT/JP2022/037997 mailed Dec. 27, 2022.
(Continued)

*Primary Examiner* — Phillip A Johnson
(74) *Attorney, Agent, or Firm* — Chrisman Gallo Tochtrop LLC

(57) ABSTRACT

A rolling bearing includes an outer ring, an inner ring, a rolling element disposed in a rollable manner between the outer ring and the inner ring, and an O-ring made of an elastic body and fitted to a peripheral groove provided at an outer peripheral surface of the outer ring. A first bottom surface is provided at a center of the peripheral groove in an axial direction, and a second bottom surface is provided at an end part of the first bottom surface in the axial direction. The second bottom surface extends in a circumferential direction and has a smaller diameter than the first bottom surface.

18 Claims, 6 Drawing Sheets

(51) Int. Cl.
*F16C 33/58* (2006.01)
*F16C 35/077* (2006.01)

(56) References Cited

U.S. PATENT DOCUMENTS

| | | |
|---|---|---|
| 8,388,232 B2 | 3/2013 | Iida et al. |
| 2010/0014794 A1 | 1/2010 | Iida et al. |
| 2011/0232245 A1* | 9/2011 | Protasiewicz .......... F16J 15/062 |
| | | 55/502 |

FOREIGN PATENT DOCUMENTS

| | | |
|---|---|---|
| JP | 5024986 B | 9/2012 |
| JP | 5505549 B2 | 5/2014 |
| JP | 2015-072034 A | 4/2015 |
| JP | 2017-101770 A | 6/2017 |

OTHER PUBLICATIONS

International Search Report for corresponding International Application No. PCT/JP2022/037997 mailed Dec. 27, 2022.
Written Opinion for corresponding International Application No. PCT/JP2022/037997 dated Dec. 27, 2022.
Extended European Search Report dated Oct. 23, 2025 for corresponding European Application No. 22886693.5.

* cited by examiner

ROLLING BEARING

CROSS-REFERENCE TO RELATED APPLICATIONS

This application is a national stage entry of International Application No. PCT/JP2022/037997 filed on Oct. 12, 2022, which claims the benefit of priority to Japanese Application No. JP2021-176773, filed Oct. 28, 2021, the entire disclosures of which are hereby incorporated herein by reference.

TECHNICAL FIELD

The present invention relates to a rolling bearing.

BACKGROUND ART

There has been known a technique for mounting an O-ring made of an elastic body at an outer peripheral surface of a bearing ring of a rolling bearing to achieve hermeticity and absorb vibration of a device mounted with the rolling bearing at a housing.

CITATION LIST

Patent Literature

Patent Document 1: JP 5505549 B
Patent Document 2: JP 2015-72034 A

SUMMARY OF INVENTION

Technical Problem

It is desirable that a repulsive force of the O-ring against the housing be high for improvement of hermeticity and vibration absorbing property using the O-ring. However, in this case, the O-ring is likely to be broken or ruptured in an attachment process of mounting the rolling bearing at the housing.

In one aspect, an object is to provide a rolling bearing capable of suppressing breakage of an O-ring.

Solution to Problem

In one mode, a rolling bearing includes an outer ring, an inner ring, a rolling element disposed in a rollable manner between the outer ring and the inner ring, and an O-ring made of an elastic body and fitted to a peripheral groove provided at an outer peripheral surface of the outer ring. A first bottom surface is provided at a center of the peripheral groove in an axial direction, and
  a second bottom surface is provided at an end part of the first bottom surface in the axial direction. The second bottom surface extends in a circumferential direction and has a smaller diameter than the first bottom surface.

According to the one mode, it is possible to suppress breakage of the O-ring.

DESCRIPTION OF EMBODIMENTS

Figure 1:
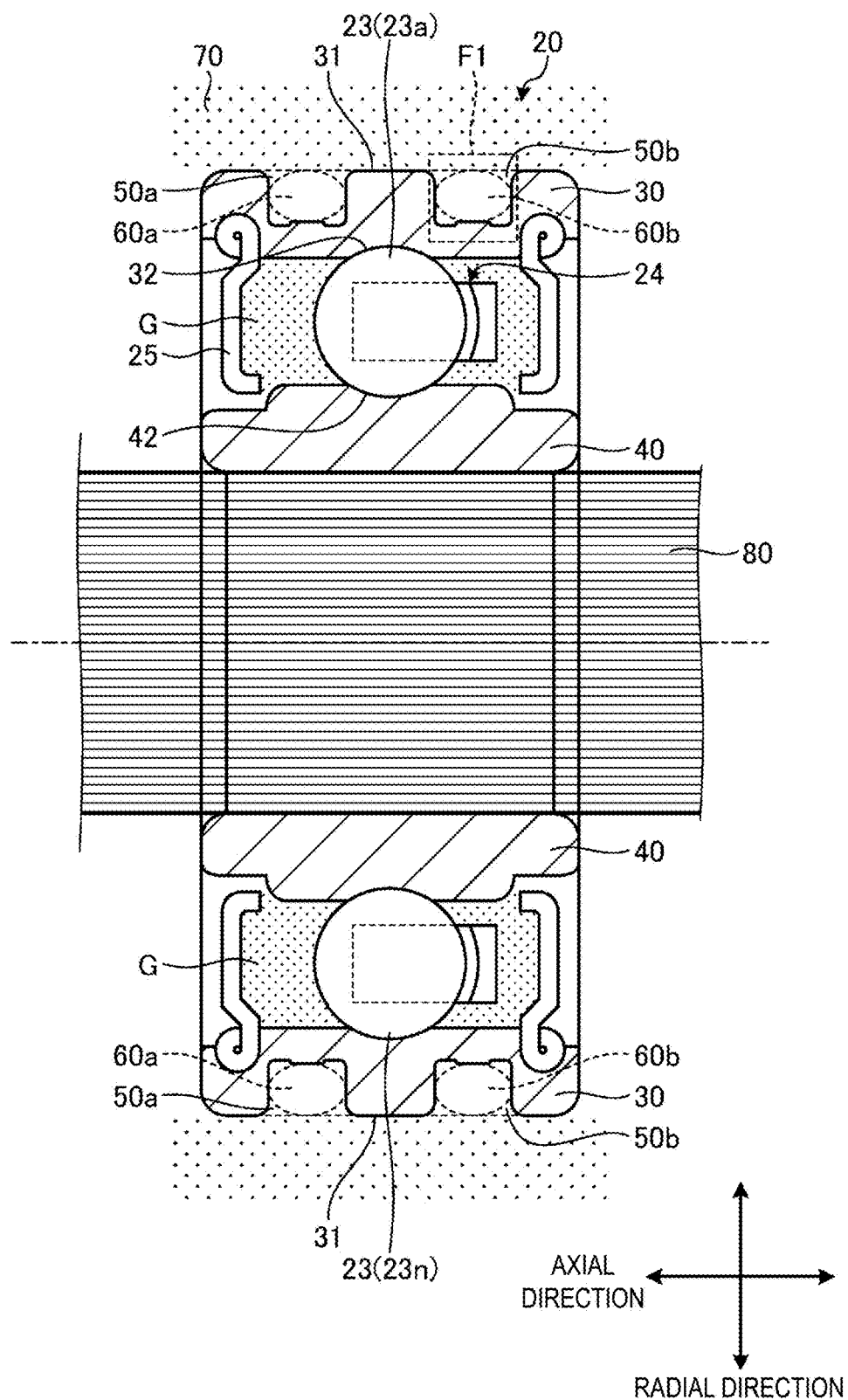
FIG. 1 is a side cross-sectional view illustrating an example of a rolling bearing according to an embodiment.

An embodiment of a rolling bearing disclosed in the present application will be described below in detail with reference to the drawings. Note that dimensional relationships between elements and scales of elements in the drawings may differ from actual configurations. The drawings may include parts having mutually different dimensional relationships and scales. For the sake of clarity of description, a coordinate system with an extension direction of a below-described shaft 80 defined as an axial direction may be illustrated in the drawings. In addition, a circumferential direction and a radial direction in the following description indicate a circumferential direction and a radial direction of a rolling bearing 20 described below.

EMBODIMENTS

First, a rolling bearing according to the embodiment will be described. FIG. 1 is a side cross-sectional view illustrating an example of the rolling bearing according to the embodiment. FIG. 1 illustrates a cross section of the annular rolling bearing 20 taken along the diameter of the rolling bearing 20. That is, a configuration illustrated at an upper part of FIG. 1 and a configuration illustrated at a lower part of FIG. 1 indicate an upper part and a lower part of an annular member with some exceptions.

As illustrated in FIG. 1, the rolling bearing 20 according to the embodiment includes an outer ring 30, an inner ring 40 disposed at an inner peripheral side of the outer ring 30, a plurality of spherical rolling elements 23, a retainer 24, and a seal member 25. The inside sealed by the seal member 25 is filled with grease G. Note that the seal member 25 and the retainer 24 are not essential. A full ball bearing not including the retainer 24 is also included in the technical scope of the present invention.

The plurality of rolling elements 23 are, for example, metal spheres and are provided in a rollable manner between a raceway groove 32 of the outer ring 30 and a raceway groove 42 of the inner ring 40. For example, the plurality of rolling elements 23 are disposed at equal intervals in the circumferential direction. In FIG. 1, only some of the rolling elements 23a and 23n are illustrated among the plurality of rolling elements 23.

The retainer 24 includes pockets rotatably retaining the rolling elements 23. The grease G is disposed in a bearing space surrounded by the outer ring 30 and the inner ring 40. In addition, the grease G is sealed at the inner peripheral surface side of the outer ring 30 at both of one side in the axial direction and another side in the axial direction across the plurality of rolling elements 23 in the bearing space. The volume of the sealed grease G is, for example, 3 to 60% of the volume of the bearing space.

The rolling bearing 20 according to the embodiment rotatably supports the shaft 80. Moreover, the rolling bearing 20 is mounted such that the rolling bearing 20 is inserted into a housing 70 of a fan motor, a pump, a valve opening/closing mechanism, a transmission, or the like. At this time, an O-ring 60 made of an elastic body such as rubber is disposed between the rolling bearing 20 and the housing 70 in the radial direction to, for example, achieve hermeticity and absorb vibrations. In the embodiment, the O-ring 60 is disposed such that the O-ring 60 is fitted to a peripheral groove 50 formed at an outer peripheral surface 31 of the outer ring 30 of the rolling bearing 20.

The peripheral groove 50 is formed in the circumferential direction along the outer peripheral surface 31 of the outer ring 30 of the rolling bearing 20. For example, a plurality of the peripheral grooves 50 are arranged at equal intervals in the axial direction. In this case, the O-ring 60 may be fitted to only one of the plurality of formed peripheral grooves 50 or may be fitted to both of the peripheral grooves 50. Further, only one peripheral groove 50 may be provided at the outer peripheral surface 31. As illustrated in FIG. 1, the rolling bearing 20 according to the embodiment includes two peripheral grooves 50a and 50b formed to be spaced apart in the axial direction. Note that, in the following, the peripheral grooves 50a and 50b, when expressed without distinction, may be simply expressed as peripheral grooves 50.

As the elastic body forming the O-ring 60, for example, a known rubber such as NBR, hydrogenated NBR, EPDM, acrylic rubber, or fluorine rubber is used. Note that the elastic body forming the O-ring 60 desirably has heat resistance, oil resistance, cold resistance, and chemical resistance in accordance with usage of the O-ring 60.

In the embodiment, the O-ring 60 is disposed at each of the peripheral grooves 50a and 50b. That is, in the embodiment, two O-rings 60a and 60b are disposed at the rolling bearing 20. Note that, in the following, the O-rings 60a and 60b, when expressed without distinction, may be simply expressed as O-rings 60.

Figure 2:
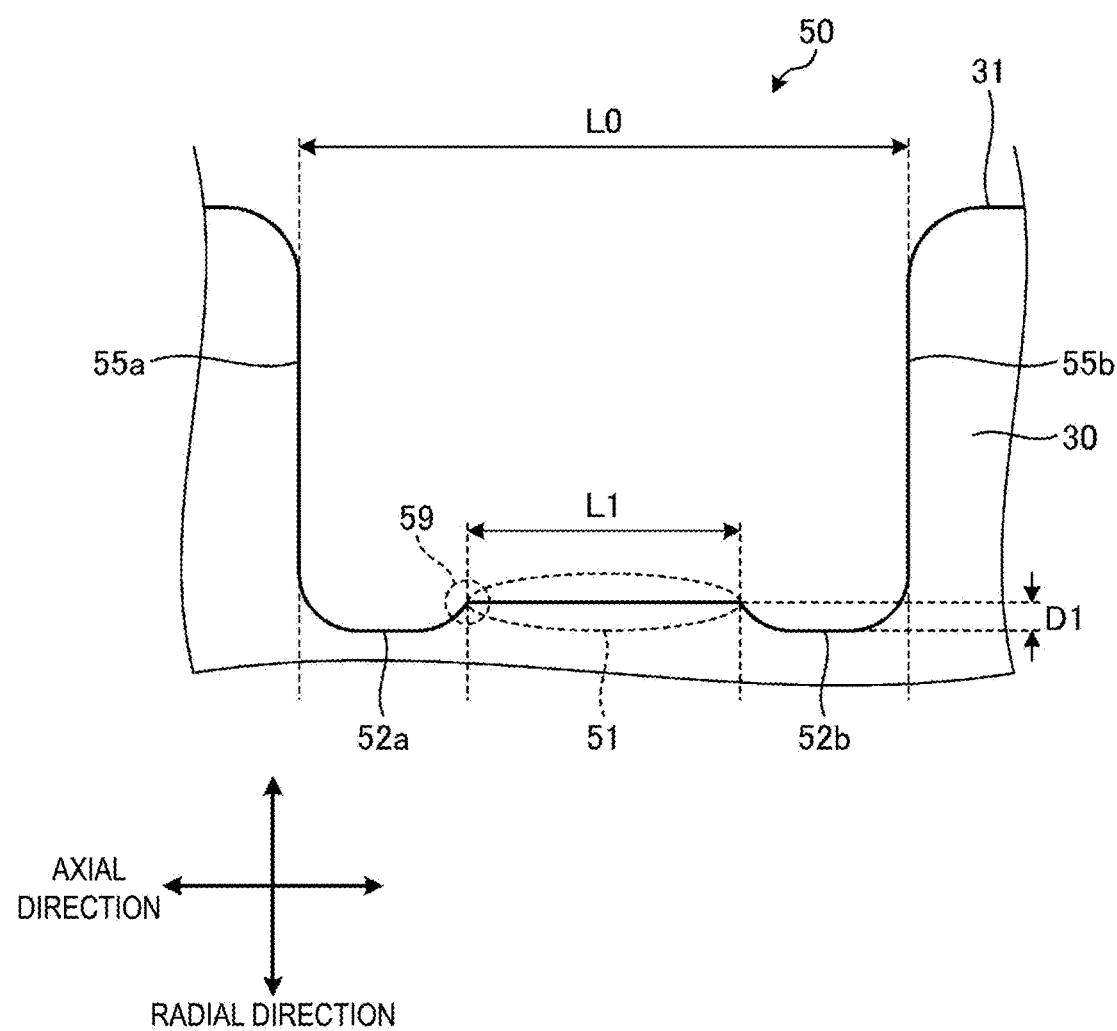
FIG. 2 is an enlarged cross-sectional view illustrating an example of a peripheral groove of a rolling bearing according to an embodiment.

As illustrated in FIGS. 1 and 2, a plurality of bottom surfaces having different depths in the radial direction are formed at the peripheral grooves 50. FIG. 2 is an enlarged cross-sectional view illustrating an example of the peripheral groove of the rolling bearing according to the embodiment. FIG. 2 is an enlarged view of a part illustrated in a frame F1 of FIG. 1.

As illustrated in FIG. 2, the peripheral groove 50 include a first bottom surface 51, two second bottom surfaces 52a and 52b, and two sidewalls 55a and 55b. Note that hereinafter, the second bottom surfaces 52a and 52b, when expressed without distinction, may be simply expressed as second bottom surfaces 52, and the sidewalls 55a and 55b, when expressed without distinction, may be simply expressed as sidewalls 55.

The sidewalls 55 are formed substantially parallel to the radial direction. That is, in the embodiment, neither a part protruding nor a part notched in the axial direction is formed at the peripheral groove 50.

The first bottom surface 51 of the peripheral groove 50 extends in the circumferential direction of the rolling bearing 20. In the embodiment, the first bottom surface 51 is formed such that the distance to the housing 70 and the distance to the shaft 80 are substantially constant in the radial direction. In this case, as illustrated in FIG. 2, the cross section of the first bottom surface 51 in the axial direction has a linear shape substantially parallel to the axial direction.

The second bottom surfaces 52a and 52b extend in the circumferential direction in a manner similar to the first bottom surface 51 and are formed adjacent to the first bottom surface 51 in the axial direction. That is, the first bottom surface 51 is provided at the center of the peripheral groove 50 in the axial direction, and the pair of second bottom surfaces 52a and 52b are provided at both ends of the first bottom surface 51 in the axial direction. For example, the second bottom surface 52a is in contact with the first bottom surface 51 at a contact point 59 illustrated in FIG. 2.

The second bottom surfaces 52 are formed radially inward of the first bottom surface 51 by a size D1. That is, the sizes of the second bottom surfaces 52 in the radial direction are smaller than the size of the first bottom surface 51 in the radial direction.

Further, outer end parts of the second bottom surfaces 52 in the axial direction are located inward of the sidewalls 55 in the axial direction. For example, as illustrated in FIG. 2, a left end part of the second bottom surface 52a in the drawing is located at the right side of the sidewall 55a in the drawing, and a right end part of the second bottom surface 52b in the drawing is located at the left side of the sidewall 55b in the drawing.

In the embodiment, for example, the second bottom surfaces 52 may be formed such that the distances to the housing 70 and the distances to the shaft 80 in the radial direction change. For example, as illustrated in FIG. 2, outer parts of the second bottom surfaces 52, that is, parts in contact with the sidewalls 55 and parts in contact with the first bottom surface 51 have larger sizes in the radial direction than central parts of the second bottom surfaces 52.

Note that, in the embodiment, the sizes of the second bottom surfaces 52 in the radial direction continuously change in the axial direction. That is, the cross sections of the second bottom surfaces 52 in the axial direction have arc shapes as illustrated in FIG. 2. On the other hand, in the embodiment, the first bottom surface 51 and the second bottom surfaces 52 are not continuous. For example, as illustrated in FIG. 2, parts substantially parallel to the axial direction are not formed at parts of the second bottom surfaces 52 in contact with the first bottom surface 51.

In the embodiment, the first bottom surface 51 is formed to occupy a certain part of the peripheral groove 50 in the axial direction. The peripheral groove 50 according to the embodiment is formed such that, for example, a length L1 of the first bottom surface 51 in the axial direction is 40% or more of a length L0 of the peripheral groove 50 in the axial direction, that is, the distance between the sidewalls 55a and 55b.

Figure 3:
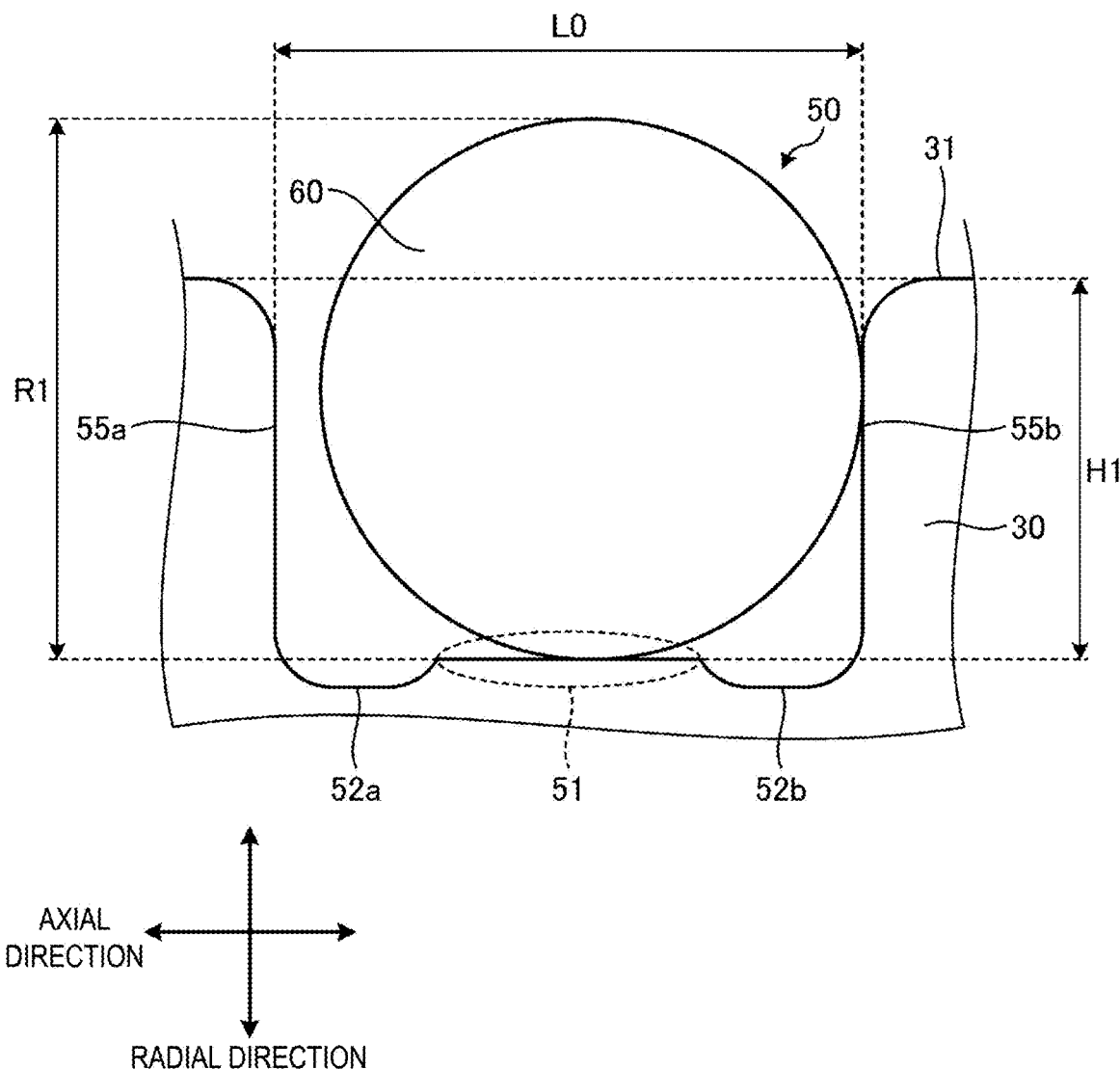
FIG. 3 is an enlarged cross-sectional view illustrating an example of a peripheral groove. At the peripheral groove, an O-ring according to an embodiment is disposed.

As illustrated in FIG. 3, the O-ring 60 is disposed at the peripheral groove 50 illustrated in FIG. 2. FIG. 3 is an enlarged cross-sectional view illustrating an example of the peripheral groove. At the peripheral groove, the O-ring according to the embodiment is disposed. As illustrated in FIG. 3, a distance H1 from the first bottom surface 51 of the peripheral groove 50 to the outer peripheral surface 31 of the outer ring 30 of the rolling bearing 20 is smaller than a diameter R1 of the O-ring 60. On the other hand, the length L0 of the peripheral groove 50 in the axial direction is larger than the diameter R1 of the O-ring 60. In this case, as illustrated in FIG. 3, the O-ring 60 disposed at the peripheral groove 50 protrudes radially outward relative to the peripheral groove 50 but is not in contact with at least one of the sidewalls 55a and 55b.

Figure 4A:
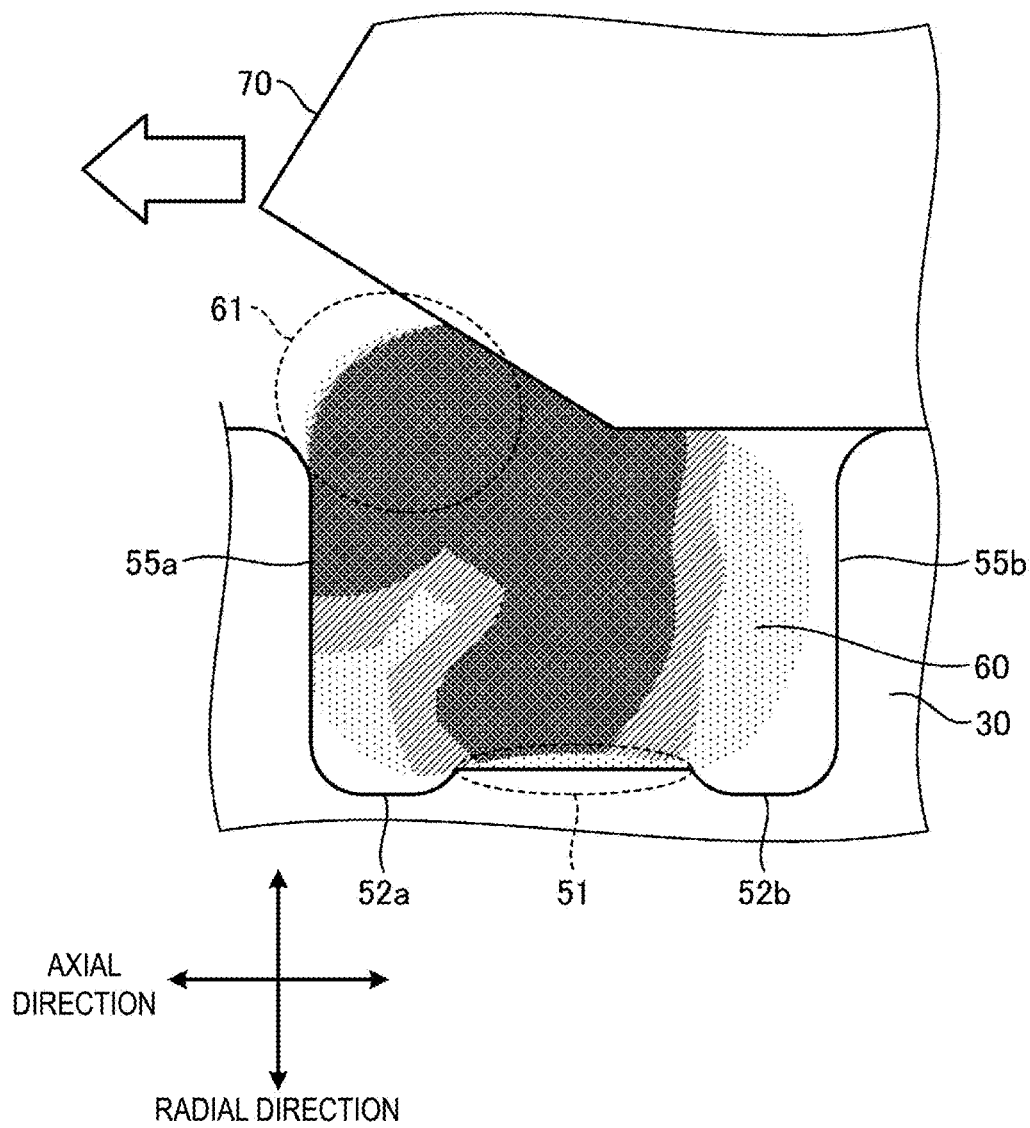
FIG. 4A is an enlarged cross-sectional view illustrating an example of a process of attaching a rolling bearing according to an embodiment to a housing.
Figure 4B:
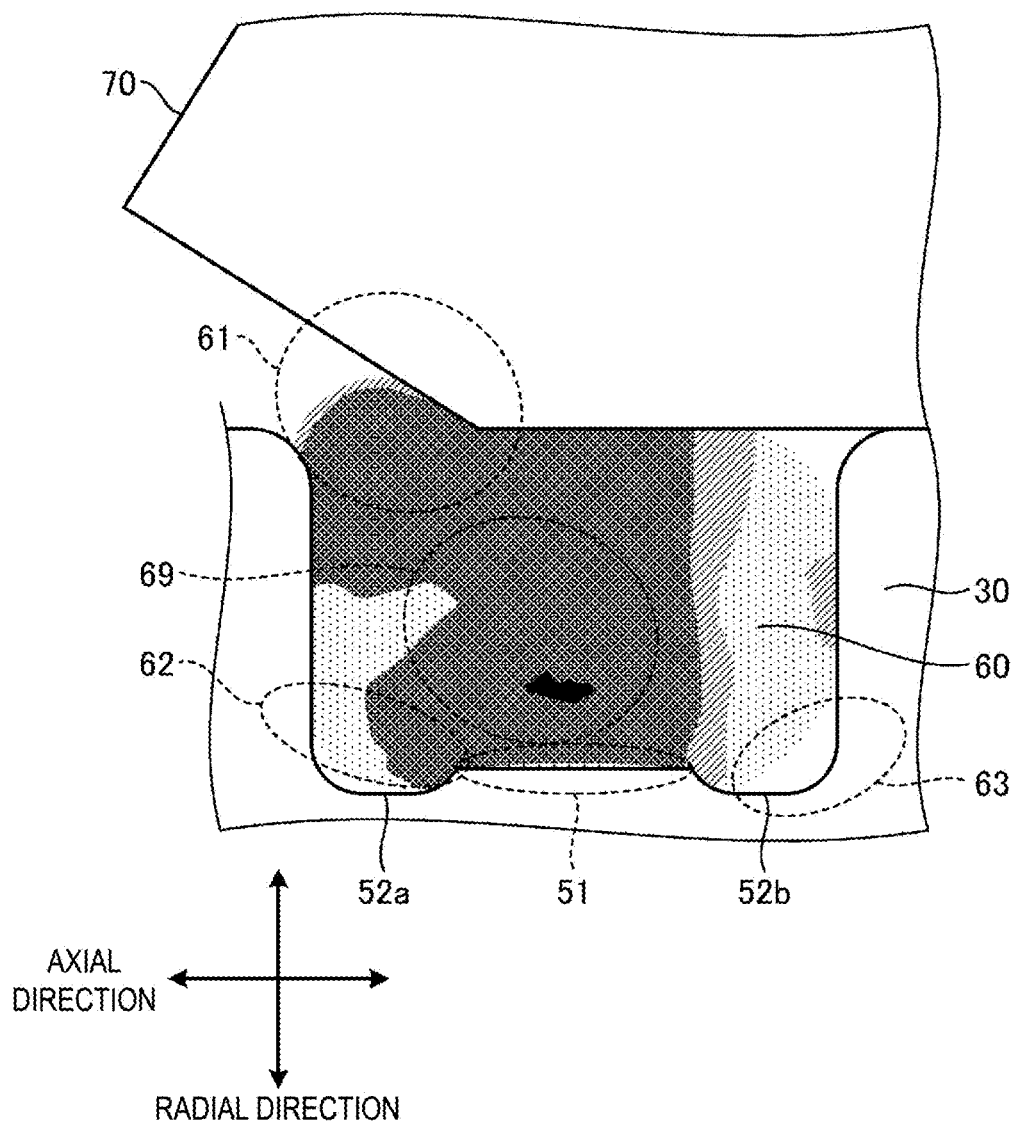
FIG. 4B is an enlarged cross-sectional view illustrating an example of a process of attaching a rolling bearing according to an embodiment to the housing.
Figure 5:
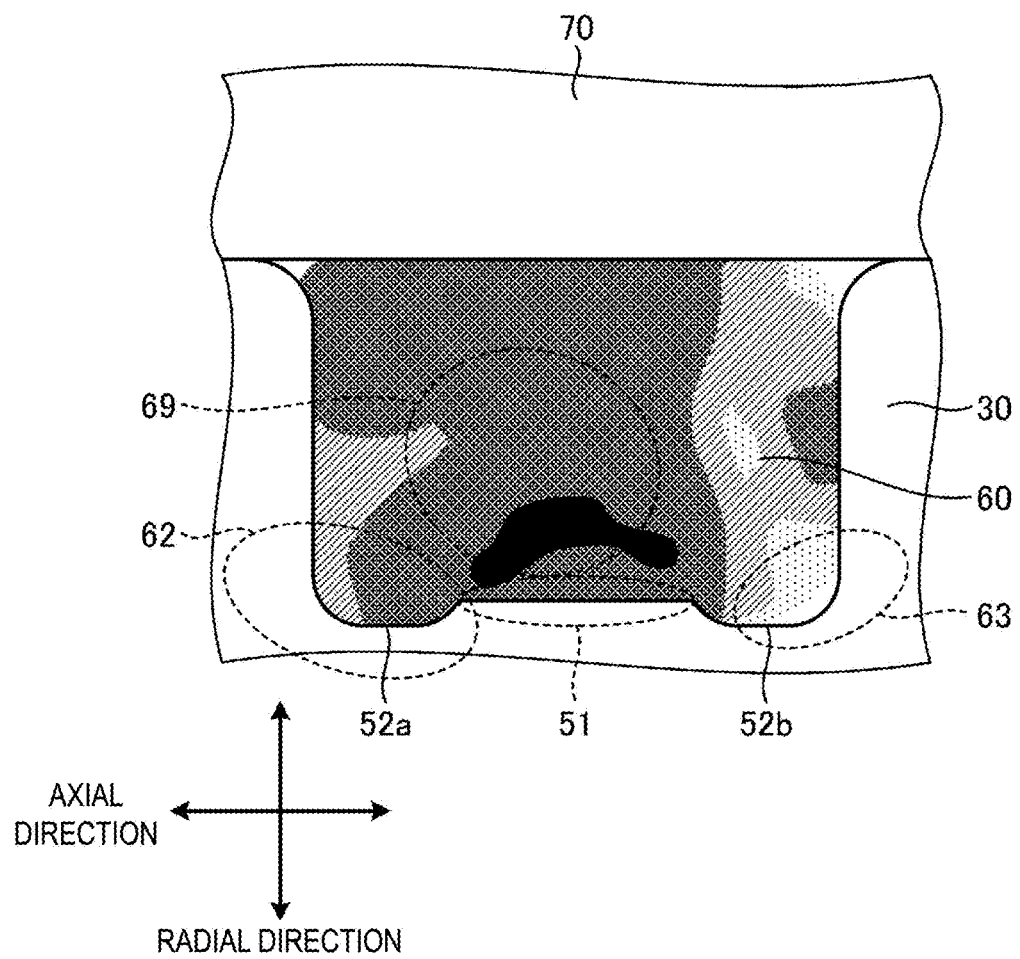
FIG. 5 is an enlarged perspective view illustrating an example of a rolling bearing attached to a housing according to an embodiment.

The rolling bearing 20 according to the embodiment is inserted into the housing 70 as illustrated in FIG. 4A to FIG. 5 in a state of the O-ring 60 being disposed at the peripheral groove 50 as illustrated in FIG. 3. FIGS. 4A and 4B are enlarged cross-sectional views illustrating examples of a process of attaching the rolling bearing according to the embodiment to the housing. FIG. 5 is an enlarged perspective view illustrating an example of the rolling bearing attached to the housing according to the embodiment. In FIGS. 4A to 5, the depth of color of the pressed and deformed O-ring 60 indicates the strength of a stress applied to the O-ring 60.

In FIGS. 4A and 4B, the housing 70 moves relative to the rolling bearing 20 in a direction indicated by an arrow in FIG. 4A from the right direction to the left direction in the drawing, that is, from a direction of the positions of the sidewall 55b and the second bottom surface 52b to a direction of the positions of the sidewall 55a and the second bottom surface 52a. In this case, as illustrated in FIG. 4A, a part 61 (first part 61) of the O-ring 60 protruding radially outward from the peripheral groove 50 in FIG. 3 is pressed by the housing 70 leftward in the drawing and deformed. At this time, the O-ring 60 in contact with the sidewall 55b moves toward the sidewall 55a, and a stress is applied to the deformed O-ring 60 with the first part 61 as the center as illustrated in FIG. 4A.

Then, the housing 70 further moves relative to the rolling bearing 20, and thus another part 62 (second part 62) of the pressed and deformed O-ring 60 moves to a position close to the one second bottom surface 52a of the peripheral groove 50 (the second bottom surface located at a position approached by the housing 70 later). Further, still another part 63 (third part 63) of the O-ring 60 moves to a position close to the other second bottom surface 52b of the peripheral groove 50 (the second bottom surface in position to approach the housing 70 first). Thus, the O-ring 60 is accommodated in the peripheral groove 50 without substantially protruding radially outward relative to the outer peripheral surface 31 of the outer ring 30 of the rolling bearing 20. Note that, in the embodiment, the second part 62 is larger than the third part 63.

A large stress is applied to the first part 61 when the outer ring 30 is fitted to the housing 70 with the O-ring 60 disposed at the outer ring 30. However, in the embodiment, a stress applied to the O-ring 60 is not concentrated only on the first part 61, but is dispersed to the other parts. For example, as illustrated in FIG. 4B, a stress applied to the first part 61 is smaller than a stress applied to a part 69 (fourth part 69) close to the first bottom surface 51 of the peripheral groove 50. In this case, rupture of the O-ring 60 in the attachment process is suppressed.

Then, as illustrated in FIG. 5, in a state of the outer ring 30 being fitted to the housing 70 (a state after the rolling bearing 20 is inserted into the housing 70), the O-ring 60 is pressed and deformed, and as a result, the second part 62 is in contact with the one second bottom surface 52a in the radial direction and the third part 63 is in contact with the other second bottom surface 52b in the radial direction. Further, the fourth part 69 of the O-ring 60 is in contact with the first bottom surface 51 of the peripheral groove 50 in the radial direction. That is, the parts of the O-ring 60 protrude radially inward relative to the first bottom surface 51 at both sides of the first bottom surface 51 in the axial direction, so that the O-ring 60 has a substantially C shape as illustrated in FIG. 5. Note that the second part 62 and the third part 63 are not necessarily in contact with the second bottom surface 52a and the second bottom surface 52b, respectively. Further, the fourth part 69 of the O-ring 60 is preferably in contact with the first bottom surface 51 of the peripheral groove 50 over the entirety of the first bottom surface 51 in the axial direction. For example, the deformed O-ring 60 is preferably in contact not only with the contact point 59 between the first bottom surface 51 and the second bottom surface 52a but also with a contact point between the first bottom surface 51 and the second bottom surface 52b.

Moreover, as illustrated in FIG. 5, a larger stress is applied from the first bottom surface 51 to the fourth part 69 in contact with the first bottom surface 51. In particular, as illustrated in FIG. 2, in the vicinity of the contact point 59 between the first bottom surface 51 and the second bottom surface 52a of the peripheral groove 50, a corner part abuts against the O-ring 60, thereby further increasing a stress. The deformed O-ring 60 having a substantially C-shaped cross section attempts to return to have an O-shaped cross section, and thus the stress acts as a repulsive force against the housing 70. Thus, the O-ring 60 can exert a sufficient repulsive force against the housing 70.

As described above, the rolling bearing 20 according to the embodiment includes the outer ring 30, the inner ring 40, the rolling elements 23 disposed in a rollable manner between the outer ring 30 and the inner ring 40, and the O-ring 60 made of an elastic body and fitted to the peripheral groove 50 provided at the outer peripheral surface 31 of the outer ring 30. The first bottom surface 51 is provided at the center of the peripheral groove 50 in the axial direction, and the second bottom surfaces 52a and 52b extending in the circumferential direction and having smaller diameters than the first bottom surface are provided at the end parts of the first bottom surface 51 in the axial direction. According to such a configuration, rupture of the O-ring 60 is suppressed, and the repulsive force of the O-ring 60 against the housing 70 can be obtained.

Further, the length L1 of the first bottom surface 51 in the axial direction is 40% or more of the length L0 of the entire peripheral groove 50 in the axial direction. Further, the first bottom surface 51 is formed such that the distance between the first bottom surface 51 and the housing 70 in the radial direction is substantially constant. According to such a configuration, a sufficient contact area is obtained between the first bottom surface 51 and the O-ring 60 in the radial direction, and thus a stress applied to the O-ring 60 in the radial direction is increased. Note that the fourth part 69 of the O-ring 60 is preferably in contact with the first bottom surface 51 of the peripheral groove 50 over the entirety of the first bottom surface 51 in the axial direction.

Moreover, the first bottom surface 51 and the second bottom surfaces 52a and 52b are not formed so as to be continuous in the axial direction. Such a configuration suppresses the stress applied to the O-ring 60 being escaped in the axial direction, and thus the repulsive force against the housing 70 is obtained.

Modifications

The configuration according to the embodiment has been described above, but embodiments are not limited to this embodiment. For example, in the embodiment, the second bottom surfaces 52a and 52b are formed so as to be symmetrical, for example, in the axial direction, but no such limitation is intended in the embodiment. For example, when the insertion direction into the housing 70 is constant, the two second bottom surfaces 52a and 52b may be asymmetric in the axial direction, or only one second bottom surface may be formed. For example, when the housing 70 moves only in the direction indicated by the arrow in FIG. 4A as described in the embodiment, rupture of the O-ring 60 can be suppressed, and the repulsive force of the O-ring 60 against the housing 70 can also be obtained even when the third part 63 is not formed. In this case, the peripheral groove 50 may be configured so as not to include the second bottom surface 52b.

An embodiment and variations of the present invention have been described above. However, the present invention is not limited to the embodiment and the variations and can be variously modified without departing from the gist of the present invention. Various modifications within a scope not departing from the gist are also included in the technical scope of the present invention, and this is obvious to a person having skill in the art from the description of the claims.

20 Rolling bearing, 23 Rolling element, 30 Outer ring, 31 Outer peripheral surface, 40 Inner ring, 50 Peripheral groove, 51 First bottom surface, 52a, 52b Second bottom surface, 55a, 55b Sidewall, 60 O-ring, 70 Housing, 80 Shaft

The invention claimed is:

1. A rolling bearing comprising:
   an outer ring;
   an inner ring;
   a rolling element disposed in a rollable manner between the outer ring and the inner ring; and
   an O-ring made of an elastic body and fitted to a peripheral groove provided at an outer peripheral surface of the outer ring, wherein
      a first bottom surface is provided at a center of the peripheral groove in an axial direction,
      a second bottom surface is provided at an end part of the first bottom surface in the axial direction, the second bottom surface extending in a circumferential direction and having a smaller diameter than the first bottom surface, and
   the first bottom surface has a shape substantially parallel to the axial direction.

2. The rolling bearing according to claim 1, wherein a length of the first bottom surface in the axial direction is 40% or more of a length of the peripheral groove in the axial direction.

3. The rolling bearing according to claim 1, wherein the second bottom surface is provided at both ends of the first bottom surface in the axial direction.

4. The rolling bearing according to claim 1, wherein the second bottom surface is formed inward of a sidewall of the peripheral groove in the axial direction.

5. A device comprising:
   the rolling bearing according to claim 1, and
   a housing, the outer ring being fitted to the housing by inserting the rolling bearing into the housing, wherein
   after the rolling bearing is inserted into the housing, a part of the O-ring is elastically deformed to have a C-shaped cross section toward the second bottom surface.

6. The device according to claim 5, wherein
   the second bottom surface is provided at both ends of the first bottom surface in the axial direction, and
   after the rolling bearing is inserted into the housing, a part of the O-ring is in contact with the first bottom surface, and another part is in contact with any one of a pair of the second bottom surfaces.

7. The device according to claim 5, wherein
   after the rolling bearing is inserted into the housing, a part of the O-ring is in contact with the first bottom surface over an entirety of the first bottom surface in the axial direction.

8. The device according to claim 5, wherein
   the first bottom surface is formed such that a distance between the first bottom surface and the housing in a radial direction is substantially constant.

9. The device according to claim 5, wherein a stress applied to the O-ring increases when a corner part formed in the vicinity of the contact point between the first bottom surface and the second bottom surface abuts against the O-ring.

10. A rolling bearing comprising:
    an outer ring;
    an inner ring;
    a rolling element disposed in a rollable manner between the outer ring and the inner ring; and
    an O-ring made of an elastic body and fitted to a peripheral groove provided at an outer peripheral surface of the outer ring, wherein
       a first bottom surface is provided at a center of the peripheral groove in an axial direction,
       a second bottom surface is provided at an end part of the first bottom surface in the axial direction, the second bottom surface extending in a circumferential direction and having a smaller diameter than the first bottom surface, and
    wherein the first bottom surface and the second bottom surfaces are not continuously formed.

11. The rolling bearing according to claim 10, wherein a corner part is formed in the vicinity of a contact point between the first bottom surface and the second bottom surface.

12. The rolling bearing according to claim 10, wherein a length of the first bottom surface in the axial direction is 40% or more of a length of the peripheral groove in the axial direction.

13. The rolling bearing according to claim 10, wherein the second bottom surface is provided at both ends of the first bottom surface in the axial direction.

14. The rolling bearing according to claim 10, wherein the second bottom surface is formed inward of a sidewall of the peripheral groove in the axial direction.

15. TA rolling bearing comprising:
    an outer ring;
    an inner ring:
    a rolling element disposed in a rollable manner between the outer ring and the inner ring; and
    an O-ring made of an elastic body and fitted to a peripheral groove provided at an outer peripheral surface of the outer ring, wherein
       a first bottom surface is provided at a center of the peripheral groove in an axial direction,
       a second bottom surface is provided at an end part of the first bottom surface in the axial direction, the second bottom surface extending in a circumferential direction and having a smaller diameter than the first bottom surface, and
    wherein parts substantially parallel to the axial direction are not formed at parts of the second bottom surfaces in contact with the first bottom surface.

16. The rolling bearing according to claim 15, wherein a length of the first bottom surface in the axial direction is 40% or more of a length of the peripheral groove in the axial direction.

17. The rolling bearing according to claim 15, wherein the second bottom surface is provided at both ends of the first bottom surface in the axial direction.

18. The rolling bearing according to claim 15, wherein the second bottom surface is formed inward of a sidewall of the peripheral groove in the axial direction.

* * * * *